Dec. 29, 1931.  W. STRUBING ET AL  1,838,717
PRONG BINDER
Filed April 7, 1926
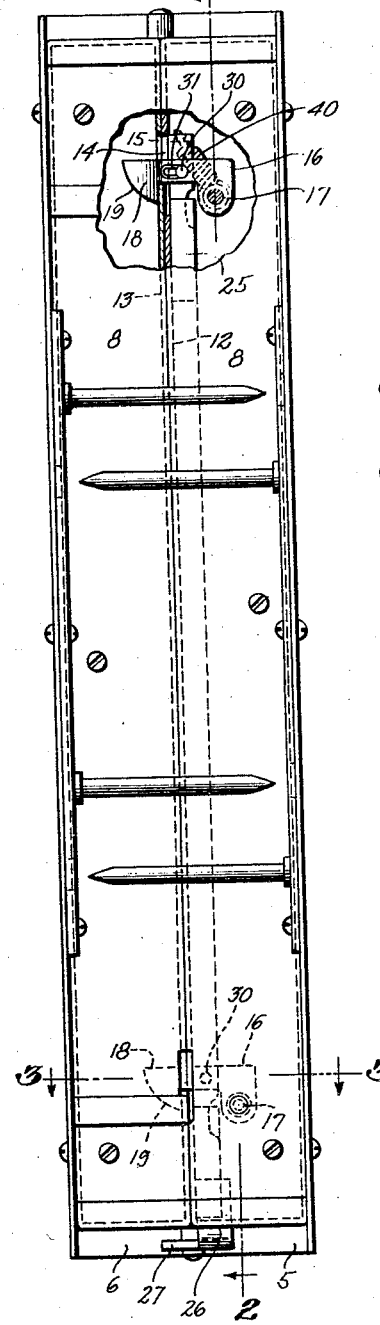
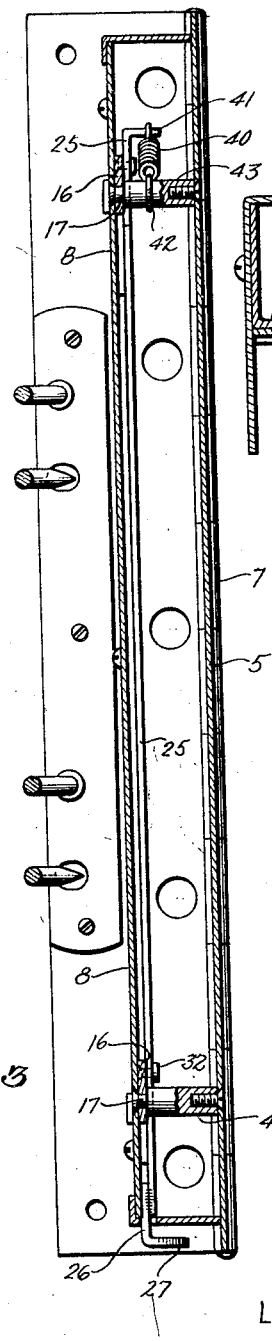
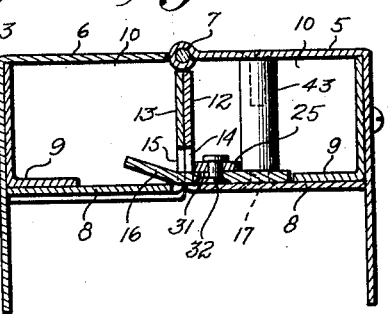
Inventors
WILLIAM STRUBING &
LAWRENCE F. SCHERZINGER
By Newell & Spencer
Attorneys Patented Dec. 29, 1931

1,838,717

UNITED STATES PATENT OFFICE

WILLIAM STRUBING AND LAWRENCE F. SCHERZINGER, OF CHICAGO, ILLINOIS, ASSIGNORS, BY MESNE ASSIGNMENTS, TO REMINGTON RAND INC., OF NEW YORK, N. Y., A CORPORATION OF DELAWARE

PRONG BINDER

Application filed April 7, 1926. Serial No. 100,251.

The present invention relates to new and useful improvements in loose-leaf binders and pertains more particularly to that type of loose-leaf binders commonly known as "prong binders".

It is one of the primary objects of the present invention to provide a new and improved locking means for use in connection with prong binders of the hinged type, whereby the hinged members may be secured in locked or closed position.

It is a further object of the invention to provide a locking means for binders of the above-mentioned type which may be readily moved to release position to permit the hinged members to move to open position.

With the above and other objects in view, reference is had to the accompanying drawings, in which:

Figure 1 is a plan view, partly broken away, of a prong binder constructed in accordance with the present invention;

Figure 2 is a longitudinal sectional view thereof on the line 2—2 of Figure 1; and Figure 3 is a transverse sectional view taken on line 3—3 of Figure 1.

Referring more particularly to the drawings, the device includes two members 5 and 6 of substantially right angular form hingedly connected together at 7. Carried by each of these members 5 and 6, there is a right angular member 8 and a suitable reenforcing member 9. This construction provides a housing 10 in each of the members 5 and 6 and also two abutting walls 12 and 13 more clearly shown in Figure 3. The abutting walls 12 and 13 are each provided with an opening, 14 and 15 respectively, which openings are so positioned with respect to their abutting wall as to be opposite to each other when the parts 5 and 6 are moved to closed position about their hinged connection.

The reference numeral 16 designates a locking dog or latch which is pivotally mounted, as at 17, to post 43 and, upon one of the members 8 and projects through the opening 14 of said member into engagement with one of the end walls of the opening 15 in the opposed member 8. Each locking dog or pawl 16 has a head portion 18 which, in turn, is formed with a curved or cam face 19 adapted to engage one of the end walls of the opening 15 when the two members 5 and 6 are moved to closed position, in order to rock the locking dogs or pawls 16 about their pivotal point to permit the members 5 and 6 to move to full closed position. As clearly shown in Figure 1, there are two of these locking dogs or pawls 16, they being arranged one adjacent each end of the binder. In order that these locking dogs or pawls 16 may be operated simultaneously or, in unison, they are connected by an operating bar 25, one end 26 of which projects beyond the member 8 by which the locking dogs or pawls are preferably carried and is provided with a thumb piece or similar operating member 27. This operating bar 25 is pivotally connected to each of the locking dogs or pawls 16, as at 30, which pivotal connection, in the present instance, includes an opening 31 in which is mounted a pin 32 carried by the bar 25. By this construction, it will be noted that as the operating bar 25 is reciprocated, the locking dogs or pawls 16 will be rocked about their pivotal point 17. This movement of the locking dogs or pawls causes them to disengage the wall of the opening 15 with which they engage to retain the members in closed position and thus permits the members to be moved to open position through the medium of the hinge 7.

For returning the locking dogs or pawls 16 to their locking position, a spring 40 is provided, said spring being connected at one end, as at 41, to the operating bar 25 and at its other end, as at 42, to a post 43 which forms the securing and spacing means of the member 8 carried by the member 5. It will thus be seen that when the operating bar 25 is operated to release the locking dogs or pawls 16, the spring 40 will be placed under tension and, when pressure upon the operating bar 25 is relieved, said spring will operate to return the locking dogs or pawls 16 to their normal locking position. It will also be noted that when the cam face 19 of the locking dogs or pawls 16 engage the wall of the opening 15, the locking dogs or pawls, will be rocked about their pivotal point against the tension of the spring 40 until they obtain the position shown in Figure 1 in which position they lock the members 5 and 6 in closed position, the locking dogs or pawls being retained in this position by the tension of the spring 40.

From the foregoing, it will be noted that the present construction provides a new and improved form of lock for prong binders of the hinged back type which locking device permits of a closing of the hinged members without direct manual operation of the locking means and, furthermore, the mechanism provides for the ready manual releasing thereof to permit the hinged back members to move to open position.

What is claimed as new is—

In a binder, the combination of a pair of sheet-metal members hingedly connected at one edge and of angular form in cross section, the free edges of said members forming supports for leaf-impaling prongs, a second pair of angle members substantially co-extensive with the first-mentioned members, each of said second angle members being mounted on one of said first-mentioned members with the edge portions abutting said first-mentioned members and with the angle portions in opposed relation to form tubular back members in cooperation with said first-mentioned members, said second angle members having one portion of each adapted to abut when the binder is closed, said abutting portions having registering openings, a plurality of posts in one of said tubular back members connected to each of the angle members thereof to assist in retaining the same in assembled relation, a latch pivotally mounted on each post and projecting through said registering openings and adapted in one position to retain said tubular back members in closed position, an operating bar connected to said latches and slidably mounted within the corresponding tubular back member between said posts and a wall thereof and resilient means mounted on one of said posts and connected to said bar for normally holding said bar and latches in locking position.

Signed at Chicago, Illinois, this 2d day of April 1926.

WILLIAM STRUBING.
LAWRENCE F. SCHERZINGER.